United States Patent
Marcerou

(10) Patent No.: US 6,317,241 B1
(45) Date of Patent: Nov. 13, 2001

(54) NORMAL DISPERSION FIBER OPTIC TRANSMISSION SYSTEM

(75) Inventor: Jean-François Marcerou, Corbeil-Essonnes (FR)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/579,709

(22) Filed: May 26, 2000

Related U.S. Application Data

(63) Continuation of application No. 08/992,966, filed on Dec. 18, 1997, now abandoned.

(30) Foreign Application Priority Data

Dec. 19, 1996 (FR) .................................................. 96 15638

(51) Int. Cl.⁷ .................................................. H04B 10/00
(52) U.S. Cl. .................................................. 359/161; 359/179
(58) Field of Search ...................... 359/124, 161, 359/173, 179, 181

(56) References Cited

U.S. PATENT DOCUMENTS

| | | | |
|---|---|---|---|
| 5,140,656 | * 8/1992 | Hasegawa et al. ............... | 385/24 |
| 5,557,441 | * 9/1996 | Mollenauer ........................ | 359/173 |
| 5,574,590 | 11/1996 | Edagawa et al. . | |
| 5,642,215 | * 6/1997 | Suzuki et al. ..................... | 359/161 |
| 5,912,750 | * 6/1999 | Takeda et al. ..................... | 359/124 |
| 5,986,789 | * 11/1999 | Kawai et al. ..................... | 359/173 |
| 6,243,181 | * 6/2001 | Golovchenko et al. ............ | 359/161 |

FOREIGN PATENT DOCUMENTS

| | | |
|---|---|---|
| 0576208 | 12/1993 | (EP) . |
| 0708539 | 4/1996 | (EP) . |
| 0730354 | 9/1996 | (EP) . |

* cited by examiner

*Primary Examiner*—Kinfe-Michael Negash
(74) *Attorney, Agent, or Firm*—Sughrue, Mion, Zinn, Macpeak & Seas, PLLC

(57) ABSTRACT

A fiber optic transmission system includes a plurality of filters with a frequency varying as a function of the distance along the transmission system in the frequency band corresponding to the normal dispersion mode of the optical fiber. In a transmission system of the above kind, non-soliton RZ or NRZ signals are transmitted at frequencies corresponding to the normal dispersion mode of the fiber. Going against the widespread prejudice in the art, non-soliton RZ or NRZ signals are transmitted in the normal dispersion mode of the optical fiber and with sliding filtering. This enables non-soliton transmission in the normal dispersion mode over great distances with a high quality factor.

10 Claims, 2 Drawing Sheets

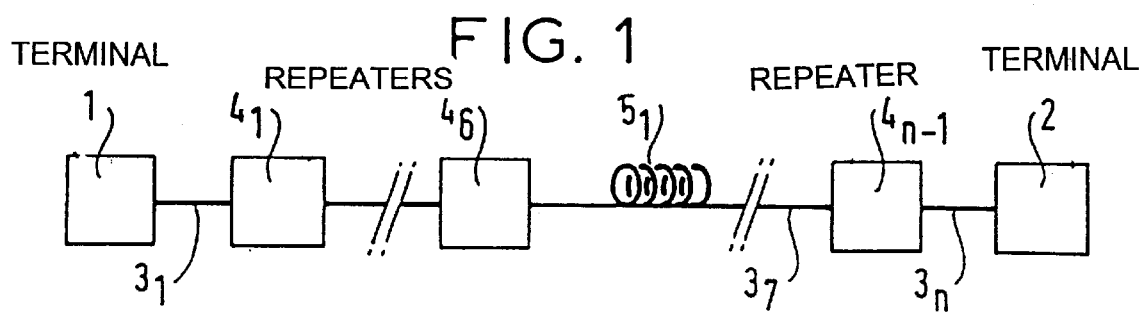
FIG. 1
FIG. 3A
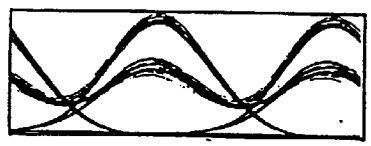
1600 Km
FIG. 3B
FIG. 3C
2400 Km
FIG. 3D
FIG. 3E
3600 Km
FIG. 3F
FIG. 3G
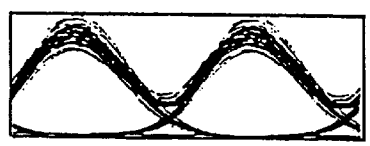
4800 Km
FIG. 3H
6000 Km
FIG. 3I
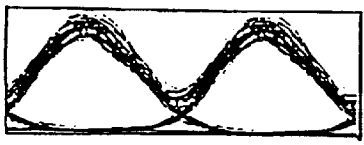
8000 Km
FIG. 3J

NORMAL DISPERSION FIBER OPTIC TRANSMISSION SYSTEM

This is a continuation of application Ser. No. 08/992,966 filed Dec. 18, 1997 now abandoned, the disclosure of which is incorporated herein by reference.

BACKGROUND OF THE INVENTION

1. Field of the Invention

The present invention consists in a fiber optic transmission system and a transmission method for a system of this kind.

2. Description of the Prior Art

The invention concerns fiber optic transmission systems. In the remainder of the present description, "long distance" or "great distance" means distances exceeding 6,000 km, which are typical of the lengths used for transoceanic transmission systems. "High bit rate" means bit rates greater than 5 Gbit/s, which are the bit rates currently envisaged for long distance transmission systems. Specific dispersion problems arise in high bit rate long distance fiber optic transmission systems.

It has been proposed, as for transmission systems, to use for the transmission of NRZ (no return to zeros or RZ (return to zero) signals a wavelength corresponding to normal dispersion conditions of the optical fiber, i.e. a negative dispersion coefficient. For high bit rates and long distances, this type of transmission is not feasible with present day optical fibers: the penalties due to dispersion over distances exceeding a few thousand kilometers are too great. It is possible to provide repeaters at short intervals, for example intervals in the order of 65 km for a total transmission length of 6,000 km and less than 45 km for a total transmission length of 8,000 km, to regenerate the signals. This solution is difficult to use for transoceanic links in which the repeaters are impossible to replace or to repair. Nor is it economically viable for long distances.

Another solution is to use soliton format signals or pulses. The transmission of soliton pulses or solitons in the abnormal dispersion part of an optical fiber is known in itself. Solitons are pulse signals having a sech" shape. With this pulse shape, the non-linearity in the corresponding part of the fiber compensates the dispersion of the optical signal. The transmission of solitons is modeled in a manner known in itself using the non-linear Schrodinger equation. The transmission of so-called "black" solitons, consisting of pulse gaps in a continuous signal, in the normal dispersion part of an optical fiber is also known in itself; in this case the solitons have a wavelength such that they propagate with negative chromatic dispersion. Various effects limit the transmission of such pulses, such as the jitter induced by the interaction of the solitons with the noise present in the transmission system, as described for example in the article by J. P. Gordon and H. A. Haus, Optical Letters, vol. 11 No. 10, pages 665–667. This effect, known as the Gordon-Haus effect, imposes a theoretical limit on the quality or on the bit rate of transmission using solitons. Systems have been proposed using sliding guide filters to control the jitter of the transmitted solitons so that this limit can be exceeded—see for example EP-A-0 576 208, which specifies that only solitons can be guided by sliding filters and that other types of pulse suffer catastrophic energy losses due to the sliding filtering.

The transmission of soliton pulses or solitons in the abnormal dispersion part of an optical fiber is the generally acknowledged solution at present for high bit rate long distance fiber optic transmission systems. Nevertheless, this solution has drawbacks, and in particular implies a spread of the arrival times of the pulses that often represents a heavy penalty. Also, the soliton pulses interact, which limits the usable bit rate by imposing a minimal "distance" between two neighboring solitons—see for example F. M. Mitschke and L. F. Mollenauer, Optical Letters, vol. 22, No. 5, pages 355–357.

As explained above, there is a prejudice in the art as to the feasibility of a high bit rate long distance fiber optic link using the normal dispersion part of the optical fiber.

The invention proposes a novel and unexpected solution to the problem of dispersion in high bit rate long distance transmission systems which avoids the use of soliton pulses. The invention proposes a solution that goes against the general prejudice referred to above and enables the transmission of signals in the normal dispersion part of the fiber.

SUMMARY OF THE INVENTION

To be more precise, the invention proposes a fiber optic transmission system including a plurality of filters with a frequency varying as a function of the distance along the transmission system in the frequency band corresponding to the normal dispersion mode of the optical fiber.

In one embodiment, the frequencies increase as a function of the distance along the transmission system. In another embodiment, the frequencies decrease as a function of the distance along the transmission system. The frequencies can also be a non-monotonous function of the distance along the transmission system.

The rate of variation of the function associating the frequencies with the distance along the transmission system preferably has an absolute value in the range 6 GHz/1,000 km to 120 GHz/1,000 km and preferably in the range 16 GHz/1,000 km to 60 GHz/1,000 km.

The transmission system can further comprise optical fiber sections with positive dispersion in said frequency band to compensate the cumulative dispersion in the normal part of the optical fiber. The transmission system can have a length exceeding 6,000 km.

The invention also concerns a transmission method in a transmission system of the above kind entailing the transmission of non-soliton RZ or NRZ signals at frequencies corresponding to the normal dispersion mode of the fiber.

The signals can be transmitted with a bit rate exceeding 5 Gbit/s and preferably exceeding 10 Gbit/s. They can also be transmitted in wavelength division multiplexed form.

Other features and advantages of the invention will emerge from a reading of the following description of one embodiment of the invention given by way of example and with reference to the accompanying drawings.

BRIEF DESCRIPTION OF THE DRAWINGS

FIG. 1 shows one example of a transmission system structure in accordance with the invention.

FIGS. 3A through 3J show the eye diagram and the timing diagram for different distances in the case of the signal from FIG. 2.

DETAILED DESCRIPTION OF THE PREFERRED EMBODIMENT

Figure 2:
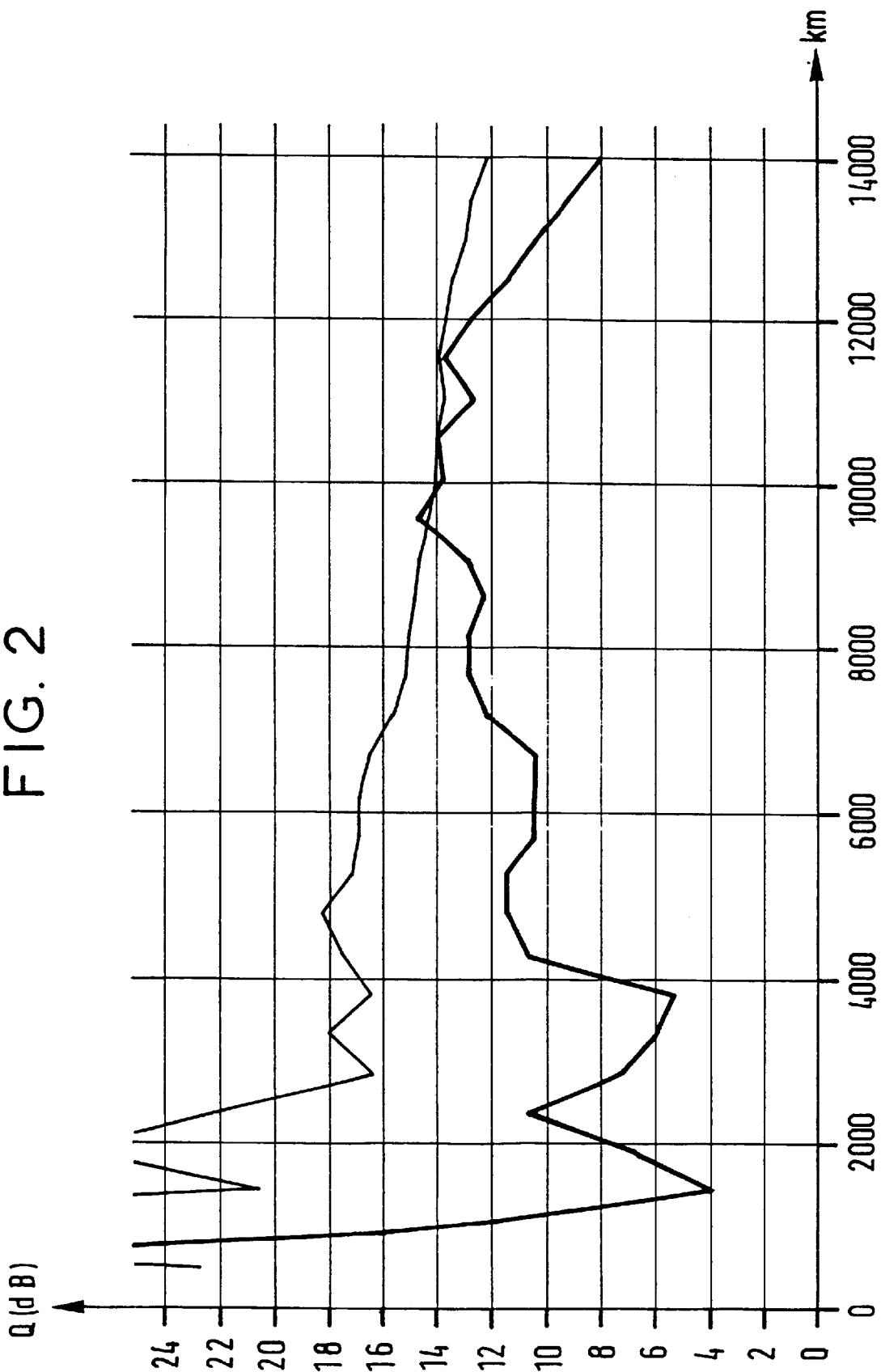
FIG. 2 is a graphical representation of the quality factor Q as a function of the distance z in a transmission system of the invention.

The invention proposes to use sliding filters in the frequency band corresponding to the normal dispersion mode of the optical fiber. Surprisingly, it has been found that sliding filters, previously suggested for compensating the jitter induced in solitons transmitted in the abnormal dispersion part of the fiber, can also be used to transmit non-soliton signals under normal dispersion conditions. The invention therefore goes against the solutions conventionally suggested to the skilled person for transmission over long distances and at high bit rates under normal dispersion conditions.

The use of sliding filters to prevent jitter on soliton signals does not in any way suggest to the skilled person applying sliding filters to signals that are not solitons or under dispersion conditions opposite those in which solitons propagate or to solve a problem other than the problem of jitter and the Gordon-Haus effect. EP-A-0 576 208, previously referred to, reflects the general state of the art on the use of sliding filters.

It is possible to use sliding filters in which the center frequency—typically half the sum of the frequencies assuring −3 dB filtering, or a corresponding definition—varies continuously upwards or downwards according to the distance along the transmission system. In the case of multi lobe filters, such as Fabry Perot filters, the center frequency is the center frequency of a lobe or the relevant parameter is the spectral gap. Digital simulation shows that in either case non-soliton RZ or NRZ signals are transmitted acceptably.

It is also possible to use sliding filters in which the center frequency varies in a non-monotonous fashion with the distance along the transmission system, typically varying in a "zig-zag", i.e. successively increasing and decreasing.

If necessary, sections of different optical fibers having positive dispersions for the wavelength of the signals transmitted can be inserted into the transmission system. One example of a transmission system using this solution is described with reference to FIG. 1.

In all cases, the "sliding rate", i.e. the rate of variation of the center frequencies as a function of the distance, in other words the ratio between the difference between the center frequencies of two neighboring filters and the distance between these filters, preferably has an absolute value between 6 GHz/1,000 km and 120 GHz/1,000 km; values between 12 GHz/1,000 km and 60 GHz/1,000 km are even more preferable and assure satisfactory results. The FIG. 1 example corresponds to a constant variation rate of −24 GHz/1,000 km. These variation rates are sufficiently low to assure an acceptable offset through the entire system, even for long distances and monotonous sliding. In the FIG. 1 example, the cumulative effect of the filters corresponds to 2.2 nm over a distance of 12,000 km, which is acceptable.

Filters of any type can be used, including Fabry Perot type filters, which are suitable and easy to use. Other types of filters are possible. Fabry Perot type filters are especially suitable for wavelength division multiplex transmission in that they have a multilobe transfer function.

Amplifier devices, such as fibers doped with rare earths, for example erbium, can be conventionally used in a transmission system of the invention to amplify the signals and to compensate the attenuation caused by transmission and filtering.

Non-soliton RZ or NRZ signals can be transmitted in a system of the invention at bit rates greater than 5 Gbit/s or 10 Gbit/s and over distances exceeding a few thousand kilometers. Wavelength division multiplexing (WDM) can be used to accommodate a plurality of communication channels in the transmission system.

FIG. 1 shows one example of a transmission system structure of the invention, intended to be used for the transmission of pulse signals described in detail with reference to FIG. 2; in the FIG. 1 example the system comprises two transmit-receive terminals 1 and 2 connected by optical fiber sections 31 through 3n separated by repeaters 41 through 4n−1; the optical fiber sections are made up of fiber having a dispersion D=−0.2 ps/nm.km and a section length of 80 km.

Each of the repeaters 41 through 4n−1 includes a Fabry Perot type filter having a width of 0.48 nm and a spectral gap of 0.77 nm; the filters have a center frequency that decreases continuously along the transmission system, with a variation rate of −24 GHz/1,000 km. Each filter is also associated with a +6 dB amplifier. Every 480 km, i.e. after six fiber sections with D=−0.2 ps/fm.km, a section 51 through 5p of optical fiber having a positive dispersion D=17 ps/nm.km is inserted into the system; these sections compensate the cumulative effect of the negative dispersion fiber sections. Each section has a length in the order of 5.6 km, which is sufficient to cancel out the dispersion over all of the six sections of 80 km and the positive dispersion fiber section. The system shown in FIG. 1 also works if the fiber having the dispersion of −0.2 ps/nm.km is replaced by a fiber having a dispersion of −0.01 ps/nm.km, with no in-line compensation. It is therefore clear that, no positive dispersion fiber section being present, there is no question of soliton conditions.

FIG. 2 is a graphic representation of the quality factor Q as a function of the distance z for the FIG. 1 transmission system. The digital simulation which yielded FIG. 2 used a stream of super-Gaussian pulses with a rise time of 40 ps and a width (FWHM) of 60 ps, conventionally for an energy equal to half the maximal energy. The pulses are transmitted at a bit rate of 10 Gbit/s.

In FIG. 2 the propagation distance in km is plotted on the abscissa axis and the quality factor in dB is plotted on the ordinate axis. The curve formed by the squares represents the amplitude quality factor Qa and the curve formed by the triangles represents the time quality factor Qt, as calculated digitally. Both these factors have a value greater than 10 dB for propagation distances greater than 6,000 km and assure a BER significantly less than $10^{-20}$ for such distances.

FIG. 2 clearly shows the technical feasibility of high bit rate long distance transmission in accordance with the invention in the normal dispersion part of the optical fiber with non-soliton RZ signals. It confirms that the transmission of such signals using sliding filters assures correct links without necessitating very closely spaced repeaters.

FIGS. 3A through 3J show the eye diagram and the timing diagram for different distances in the case of the FIG. 2 simulation. FIGS. 3A, 3C, 3E, 3G, 3T and 3J show the eye diagram for respective distances of 1,600 km, 2,400 km, 3,600 km, 4,800 km, 6,000 km and 8,000 km.

FIGS. 3B, 3D, 3F show the corresponding timing diagram for respective distances of 1,600 km, 2,400 km, 3,600 km and 8,000 km.

The aperture of the various eye diagrams shows the quality of the signal transmission in accordance with the invention for great distances. The corresponding timing diagrams further confirm the feasibility of transmission in accordance with the invention: beyond 8,000 km the eye diagram is wide open, which corresponds to acceptable values of the time and amplitude quality factors.

Of course, the present invention is not limited to the examples and embodiments described and shown, but is open to many variants evident to the skilled person. It is clear that the conventional definition of the center frequency of a filter—half the sum of the frequency assuring filtering at −3 dB—can be generalized, even if the transfer function of the filter does not have any point assuring filtering at −3 dB: it is sufficient to increase the power arbitrarily until such points actually exist. The use of the term "center frequency" is not exclusive to multilobe filters, as explained above. It is clear that different modes of variation of the center frequencies of the filters can be chosen. The transmission system has been described with reference to FIG. 2 for unidirectional transmission; it can also be used for bidirectional transmission.

What is claimed is:

1. A fiber optic transmission system including a plurality of filters with a center frequency of each filter varying as a function of the distance along said transmission system in the frequency band corresponding to the normal dispersion mode of the optical fiber.

2. The transmission system claimed in claim 1 wherein said frequencies increase as a function of the distance along said transmission system.

3. The transmission system claimed in claim 1 wherein said frequencies decrease as a function of the distance along said transmission system.

4. The transmission system claimed in claim 1 wherein said frequencies are a non-monotonous function of the distance along said transmission system.

5. The transmission system claimed in claim 1 wherein the rate of variation of the function associating said frequencies with the distance along said transmission system has an absolute value in the range 6 GHz/1,000 km to 120 GHz/1,000 km and preferably in the range 16 GHz/1,000 km to 60 GHz/1,000 km.

6. A transmission system as claimed in claim 1 further including optical fiber sections with positive dispersion in said frequency band to compensate the cumulative dispersion in the normal part of the optical fiber.

7. A transmission system as claimed in claim 1 having a length exceeding 6,000 km.

8. A transmission method in a transmission system as claimed in claim 1 entailing the transmission of non-soliton RZ or NRZ signals at frequencies corresponding to the normal dispersion mode of the fiber.

9. The method claimed in claim 8 wherein said signals are transmitted at a bit rate greater than 5 Gbit/s and preferably greater than 10 Gbit/s.

10. The method claimed in claim 8 wherein said signals are transmitted in wavelength division multiplexed form.

* * * * *